(12) United States Patent
Mayer

(10) Patent No.: US 10,060,531 B2
(45) Date of Patent: Aug. 28, 2018

(54) INWARDLY TENSIONING PLAIN COMPRESSION RING

(71) Applicant: ZF Friedrichshafen AG, Friedrichshafen (DE)

(72) Inventor: Jurgen Mayer, Horbranz (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 661 days.

(21) Appl. No.: 14/394,478

(22) PCT Filed: Mar. 12, 2013

(86) PCT No.: PCT/EP2013/054945
§ 371 (c)(1),
(2) Date: Oct. 15, 2014

(87) PCT Pub. No.: WO2013/159984
PCT Pub. Date: Oct. 31, 2013

(65) Prior Publication Data
US 2015/0048573 A1     Feb. 19, 2015

(30) Foreign Application Priority Data
Apr. 24, 2012  (DE) .......... 10 2012 206 676

(51) Int. Cl.
*F16J 15/16* (2006.01)
*F16J 15/44* (2006.01)
*F16J 15/3272* (2016.01)

(52) U.S. Cl.
CPC ......... *F16J 15/162* (2013.01); *F16J 15/3272* (2013.01); *F16J 15/442* (2013.01)

(58) Field of Classification Search
CPC ........ F16J 15/441; F16J 15/442; F16J 15/162; F16J 15/3272
See application file for complete search history.

(56) References Cited

U.S. PATENT DOCUMENTS

| 1,171,199 A | * | 2/1916 | Hicks | .......... F16J 9/14 |
| | | | | 277/494 |
| 1,181,618 A | * | 5/1916 | Smith | .......... F16J 9/14 |
| | | | | 277/498 |

(Continued)

FOREIGN PATENT DOCUMENTS

| DE | 1 056 440 | 4/1959 |
| DE | 2 146 026 | 7/1972 |

(Continued)

OTHER PUBLICATIONS

German Search Report Corresponding to 10 2012 206 676.4 dated Feb. 20, 2014.

(Continued)

*Primary Examiner* — Kristina R Fulton
*Assistant Examiner* — L. Susmitha Koneru
(74) *Attorney, Agent, or Firm* — Davis & Bujold PLLC; Michael J. Bujold

(57) ABSTRACT

An inwardly tensioning plain compression ring for sealing a rotating part with respect to a fixed part. The plain compression ring separates a positive pressure region from a low pressure area and has, in reference to the circumference, two opposite ends, designed as a joint or lock and which can be connected. A radial, inner circumferential surface, or at least at an axial circumferential surface of the plain compression ring has a ring shape lubrication groove for accommodating a supplied lubricant which comes from the positive pressure region. The plain compression ring has at least one ring shaped lubrication groove which is not completely circular, but has a closed end and an open end. The open end of the lubrication groove opens into an overflow area which is in flow connection with a leakage area of the joint or the lock.

8 Claims, 3 Drawing Sheets

(56) References Cited

U.S. PATENT DOCUMENTS

| | | | | |
|---|---|---|---|---|
| 1,198,457 | A * | 9/1916 | Knodle | F16J 9/14 277/494 |
| 2,080,935 | A * | 5/1937 | Slyk | F16J 9/14 277/496 |
| 2,485,862 | A * | 10/1949 | Caza | F16J 9/14 277/496 |
| 3,315,968 | A | 4/1967 | Hanlon | |
| 3,315,986 | A | 4/1967 | Quick | |
| 3,743,303 | A | 7/1973 | Pope | |
| 4,449,721 | A * | 5/1984 | Tsuge | F16J 9/14 277/499 |
| 5,558,341 | A * | 9/1996 | McNickle | F16J 15/3488 277/400 |
| 5,934,680 | A * | 8/1999 | Kakehi | B63H 23/32 277/499 |
| 6,692,006 | B2 * | 2/2004 | Holder | F16J 15/442 277/346 |
| 7,165,772 | B1 * | 1/2007 | Camacho | B64D 13/02 277/496 |
| 7,341,256 | B2 | 3/2008 | Nakaoka et al. | |
| 7,766,339 | B2 | 8/2010 | Umetsu et al. | |
| 7,815,195 | B2 | 10/2010 | Meller et al. | |
| 8,074,995 | B2 * | 12/2011 | Vasagar | F16J 15/3244 277/301 |
| 8,430,628 | B2 * | 4/2013 | Turnquist | F16J 9/20 415/170.1 |
| 8,454,024 | B2 | 6/2013 | Kakehi | |
| 2008/0296847 | A1 | 12/2008 | Chevrette et al. | |
| 2009/0051126 | A1 * | 2/2009 | King, Jr. | F16L 13/103 277/631 |
| 2012/0098211 | A1 * | 4/2012 | Pandey | F01D 11/02 277/631 |

FOREIGN PATENT DOCUMENTS

| | | | |
|---|---|---|---|
| DE | 39 04 978 A1 | 8/1990 | |
| DE | 103 11 155 A1 | 9/2004 | |
| DE | 603 13 630 T2 | 1/2008 | |
| DE | 10 2009 012 462 A1 | 10/2010 | |
| EP | 1 536 167 A1 | 6/2005 | |
| EP | 1 541 908 A1 | 6/2005 | |
| FR | 2 916 826 A1 | 12/2008 | |
| JP | WO 2010084853 A1 * | 7/2010 | F16J 15/164 |
| WO | 03/100301 A1 | 12/2003 | |
| WO | 2007/032332 A1 | 3/2007 | |
| WO | 2007/105589 A1 | 9/2007 | |

OTHER PUBLICATIONS

International Search Report Corresponding to PCT/EP2013/054945 dated Jun. 11, 2013.

Written Opinion Corresponding to PCT/EP2013/054945 dated Jun. 11, 2013.

* cited by examiner

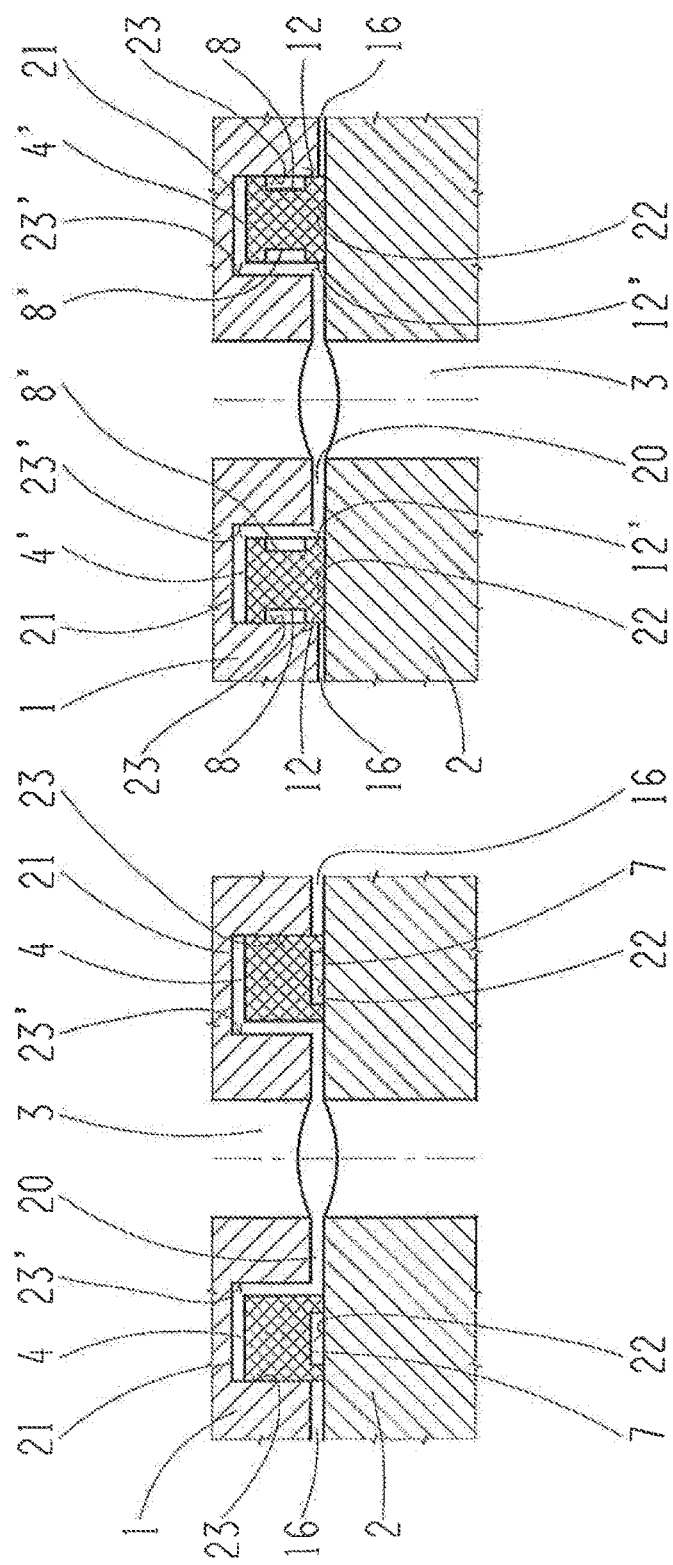

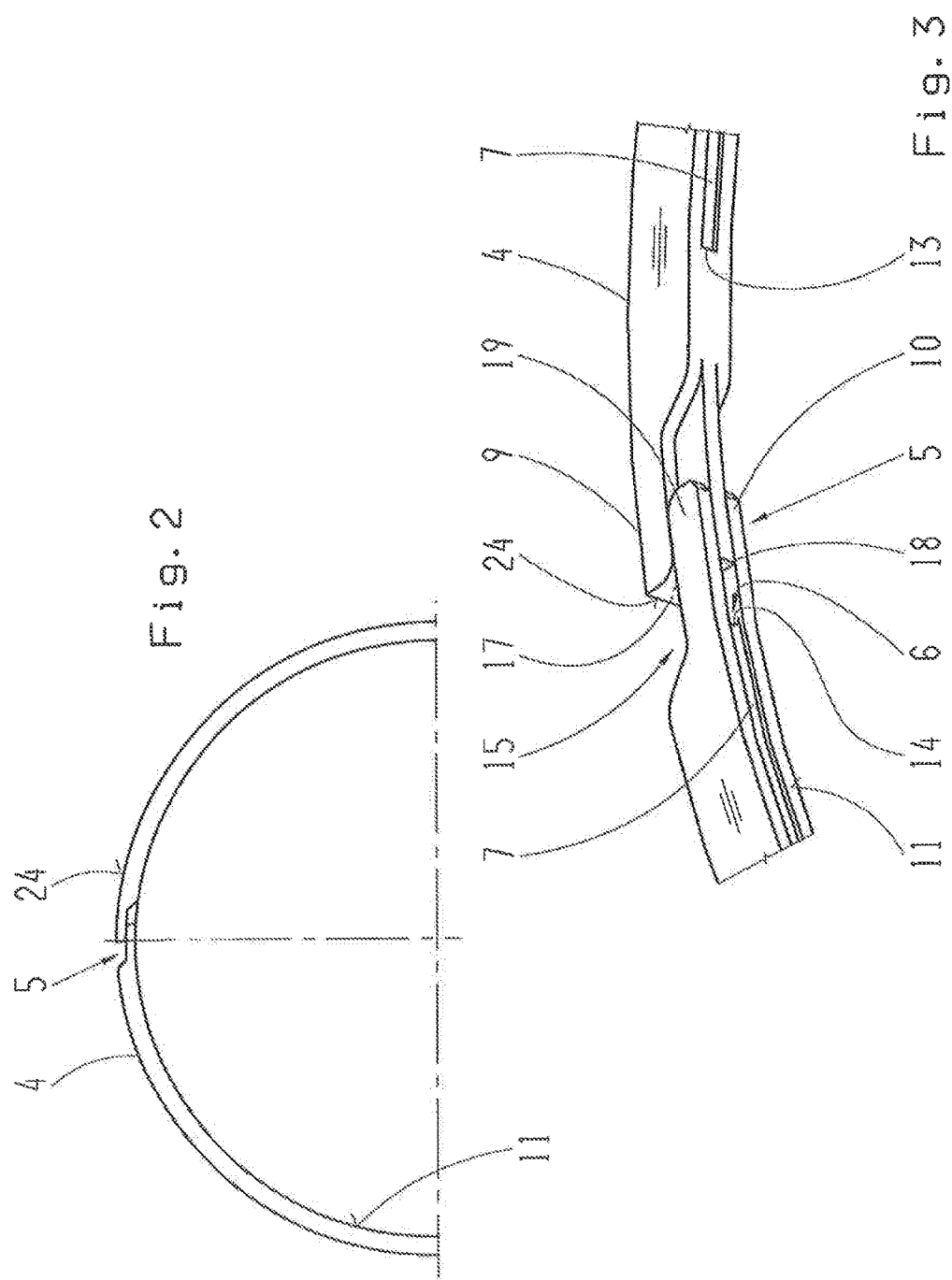

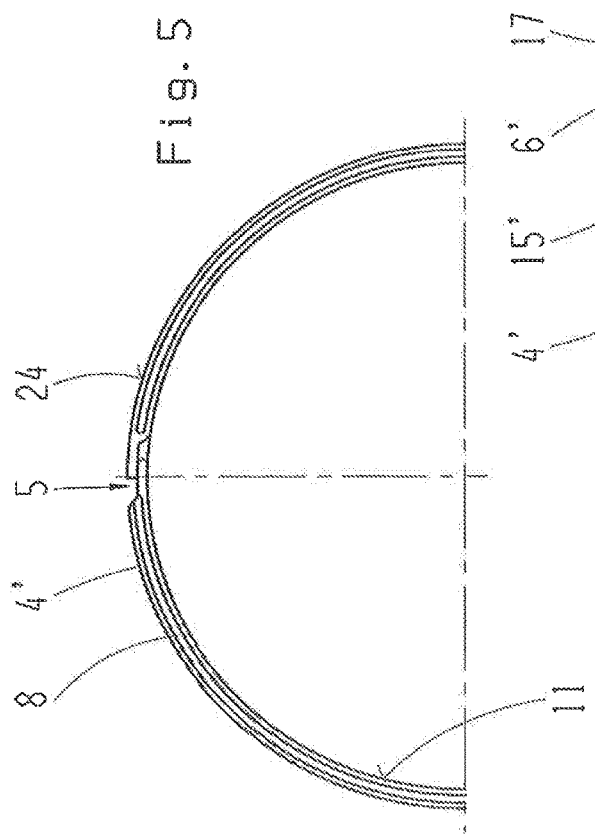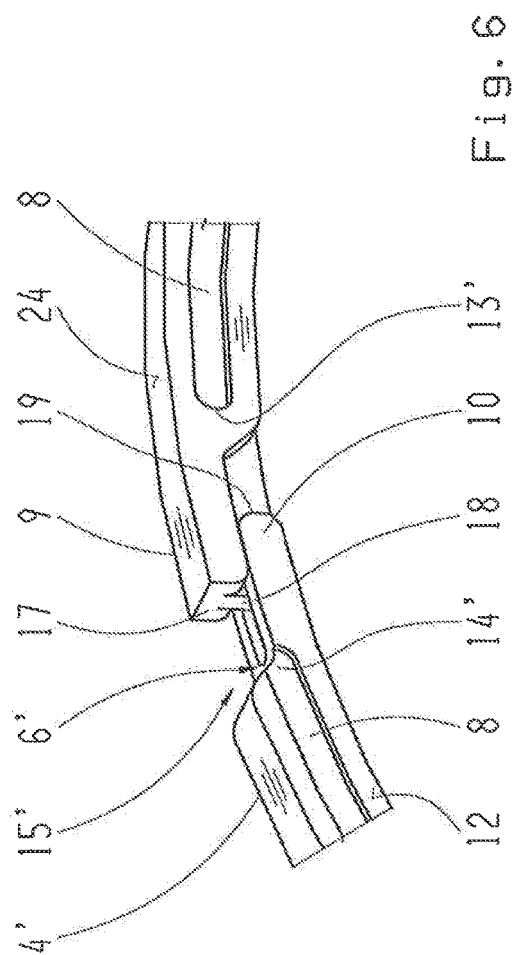

INWARDLY TENSIONING PLAIN COMPRESSION RING

This application is a National Stage completion of PCT/EP2013/054945 filed Mar. 12, 2013, which claims priority from German patent application serial no. 10 2012 206 676.4 filed Apr. 24, 2012.

FIELD OF THE INVENTION

The invention concerns an inwardly tensioning plain compression ring for sealing a rotating part in reference to a fixed part.

BACKGROUND OF THE INVENTION

Such inwardly tensioning plain compression rings are for instance used in transmission technology as a gasket to seal a fixed flange in reference to a rotatable shaft for a pressure or lubrication oil supply to a hydraulic actuated clutch. The inwardly tensioning plain compression ring is hereby positioned usually in a circumferential groove which is designed into the flange or the shaft and the inwardly tensioning plain compression ring is mounted in this groove with axial and radial play so that the pressure and lubricant oil, through a pressure chamber or positive pressure region, can penetrate into the annular groove. In many cases, such an inwardly tensioning plain compression ring is slanted or partitioned, respectively, and is also designed springy so that it, in the case of an inwardly tensioning ring, attaches with its radial inner outside or circumferential surface, respectively, to a radial outer surface tensioning at one of the two parts and that it, in the case of an outer tensioning ring, attaches itself tensioning with its radial outer surface or circumferential surface, respectively, to a radial inner surface at one of the two designated parts. In the axial direction, the inwardly tensioning plain compression ring attaches itself, through the effect of the provided pressure liquid from the positive pressure region, at the side surface of the groove with an axial circumferential surface.

Depending on a desired configuration, either the radially attached circumferential surface, or the axially attached circumferential surface of the inwardly tensioning plain compression ring, rests opposite to either one of the parts. Accordingly, each of the radial circumferential surface or axial circumferential surface serves as a sealing sliding surface during relative rotation of both parts. To limit the thermal stress, which occurs at the respective sliding surface due to the created friction force, lubrication oil can be provided at the sliding surface for the removal of heat.

It is known to position at the sliding surface of a inwardly tensioning plain compression ring, distributed across its perimeter, several pocket shaped grooves for the accommodation of a lubricant, which are connected with a pressure chamber for the lubricant.

DE 39 04 978 C2 shows such a sealing ring which axially separates two chambers with different pressure levels, whereby the two chambers are limited through a shaft and a hub which accommodates it. The sealing ring is placed in an annular groove which is located at the shaft. The sealing ring is designed as an open and outward tensioning ring with an outer surface that radially attaches to and seals the wall of a hub bore and is fixed in reference to the hub bore. Axially, the sealing ring is attached at a side wall of the groove due to the higher pressure level in the area. Into the sliding sealing surface of the ring and over the perimeter, pocket shape grooves are positioned which are open against the larger pressure in this area.

It is also known to develop a continuous, ring shaped lubrication groove or indent, respectively, which is connected with the pressure chamber. Hereby and compared to segmented lubrication as in the case of lubrication pockets, a more effective, continuous lubrication film is created at the sliding surface. Through the application of pressure at the lubrication groove, the force of pressure at the sliding surface can also be reduced evenly across the perimeter, whereby the friction losses can be further reduced.

DE 10 56 440 A shows such an inwardly tensioning plain compression ring which is positioned outward tensioning in reference to a groove, which is designed in a shaft. The sealing ring has at both of its axial circumferential surfaces, which form a sliding surface, a continuous ring shape lubrication groove. The lubrication groove being acted on by pressure or lubrication liquid through radial supply ducts which are provided at the respective head surface of the ring.

Known from DE 21 46 026 C2 is an open, outward tensioning plain compression ring which is positioned between two parts which rotate relative to each other. The inwardly tensioning plain compression ring is positioned between a groove which is designed between these two parts, wherein at one of the axial sides a larger pressure is present as compared to the opposite side. The axial lower pressure side of the sealing ring is provided with a perimeter groove which can be applied with the lock sure pressure through ducts which run through the sealing ring. The sealing ring can also be provided at its radially outer circumferential surface with an annular groove, which can be applied with a larger pressure through ducts. A herewith comparable inwardly tensioning plain compression ring is also known from U.S. Pat. No. 3,315,968 A.

With a slotted inwardly tensioning plain compression ring, its two perimeter referenced opposite ends can form a simple, open ring with a joint gap. Already known are inwardly tensioning plain compression rings, for instance piston rings, where the two circumferentially opposite ends are designed as a lock. The ends of such rings, when self-springing of the rings is present, can be brought together or separated from each other by overcoming the self-springing of the rings.

DE 10 2009 012 462 A1 shows a rotary feed through with such a rectangular the ring which is positioned between a rotor and rotating part and the stator as the fixed part, whereby the stator surrounds the rotor. In accordance with an example embodiment, the inwardly tensioning plain compression ring is placed in the peripheral groove of the rotor. Through the application of pressure via an oil supply duct, the inwardly tensioning plain compression ring is pressed with its axial circumferential surface, with the side which is opposite to the oil supply duct, against the wall of the groove, and with its radial, outer circumferential surface attached to an inner surface of the stator. Due to the different dimensions of the cross section of the ring in height and width, the resulting surface forces are applied to the ring, which are different in the axial direction and the radial direction. Through a lesser width than height, an axially static sealing area in reference to the rotor is created, which fixes the inwardly tensioning plain compression ring in reference to this part, and creates also, in reference to the stator, a radially, outer, and dynamic sealing area enables the inwardly tensioning plain compression ring to slide in reference to this part. At least the dynamic sealing area is provided with at least one recess for the creation of a dedicated leakage for cooling and lubricating. The inwardly tensioning plain compression ring has a joint, or lock, which serves as a mounting aid. The recess is designed as a pocket and is located, in accordance with a variation in there, at the outer circumference of the inwardly tensioning plain compression ring as an integrated part in the construction of the joint or lock.

SUMMARY OF THE INVENTION

Based on this background, the object of the invention is to create an inwardly tensioning plain compression ring for the sealing of a rotating part in reference to a fixed part, which is low in wear, installation friendly, and cost-effective in manufacturing.

The invention is based on the knowledge of an inwardly tensioning plain compression ring with an integrated lubrication capability, as well as a joint and lock, where the lubrication capability for the supply of lubrication can be combined through a special construction with a leakage area of the joint or lock, respectively.

Thus, the invention is directed to an inwardly tensioning plain compression ring for the sealing of a rotating part in reference to a fixed part, whereby the inwardly tensioning plain compression ring separates a positive pressure region from a low pressure region, whereby the inwardly tensioning plain compression ring has two circumferentially opposite ends which are designed as a joint or lock and they can also be connected with each other, and whereby at one radial, inner circumferential surface, or at least one axial circumferential surface of the inwardly tensioning plain compression ring, at least one ring shaped lubrication groove is designed for accommodating the lubricant which can be supplied from the over pressure area.

The invention provides for the solution of the given task that at least one ring shaped lubrication groove is not designed completely circular, but has a closed end as well as an open end, whereby the open end of the ring shape lubrication groove continues into an outflow area which is in a flow connection with a leakage area of the joint or lock, respectively.

With this inwardly tensioning plain compression ring, the friction at the sliding surface is reduced through a lubrication capability, which creates a continuous lubrication film and thus continuous, effective lubrication at the circumference, but does not need any additional bores, ducts, or the same for supplying lubrication, which reduces the manufacturing cost of the ring. Instead, a simple, possible leakage area is used based for installation reasons, manufacturing and quality reasons, respectively, because of an already available joint or lock, to connect an overflow area which supplies the lubrication groove.

By means of lubrication which is created through the lubrication, which is supplied from a positive pressure region, and the simultaneous application of pressure at the ring or lubrication groove, respectively, the pressing force of the inwardly tensioning plain compression ring at the particular sliding surface is reduced which creates an additional reduction of wear.

It is provided in a preferred embodiment of the invention that the two ends of the ring of the inwardly tensioning plain compression ring are designed as a T-lock, whereby a first end of the ring has a T-shape cross section, where its short leg is positioned radially outside and its long leg radially inside, and in which the two legs create, in the circumferential direction, a continuation of the end of the ring. It is also provided that the second end of the ring is designed to receive this continuation, whereby the long leg is received into the receptacle and the short leg overlaps the receptacle radially outside. It is also provided that the open end of the lubrication groove is positioned at the second end of the ring so that, at the radial outer circumferential surface of the inwardly tensioning plain compression ring, in an end section of the T-lock which remains open, a leakage area is designed which is supplied with lubrication from the positive pressure region and which supplies the outflow area of the lubrication groove with lubrication.

The ends of the ring can have rounded or chamfered edges, which enables them to easily interlink.

Through the T-lock shape, a guided connection of the ends of the ring is achieved. It makes sure that the ends of the ring, during the installation or when installed, cannot be moved axially against each other or create uncontrolled leakage losses or undesired clamping forces. At the same time, the two ends of the ring are designed in a way that, even when the ends of the ring are completely pressed together, a leakage area remains for the supply of the overflow area of the lubrication groove.

The geometry of the T-lock enables, without an additional effort, a constructively simple realization of a limited leakage area and a following, limited overflow area. Basically, also other joint or lock designs, respectively, for instance a so-called double step lock, are suited for the lubrication matter supply of the lubrication groove.

The construction design of a limited leakage area with a following limited overflow area can be realized with a lubrication groove, which is designed at a radially, inner circumferential surface of the inwardly tensioning plain compression ring, in a way that the overflow area is designed as a gap shaped chamber which extends at the inner circumferential surface of the inwardly tensioning plain compression ring between the open end of the lubrication groove and the open end of the longer leg of the T-lock, and which is limited by the two ends of the ring as well as by a neighboring surface, which is radial to the inner circumferential surface of the inwardly tensioning plain compression ring, of one of both parts which needs to be sealed against each other.

In this embodiment, the radial inner circumferential surface of the inwardly tensioning plain compression ring can be used as a sliding surface whereby, through the lubrication groove which is filled with lubrication material, the friction is reduced. Since the inwardly tensioning plain compression ring is constructed symmetrically with the radial lubrication groove, the installation is not dependent on a direction thus making installation easier.

A lubrication groove which is designed in an axial circumferential surface of the inwardly tensioning plain compression ring, which faces away from the positive pressure region, the limited leakage area and the then following outflow area can be realized in a way that the overflow area is designed as a gap shape chamber which extends from the axial circumferential surface between the open end of the lubrication groove, as well as the shorter leg of the T-lock, and which is limited by both ends of the ring, as well as by the neighboring surface, axial to the circumferential surface, of one of the two parts. The axial circumferential surface in this embodiment can be used as a sliding surface, in which the friction is reduced through the lubrication groove which is filled with lubricant.

To also enable an installation with an axial sliding surface of the inwardly tensioning plain compression ring which is dependent on a direction, it can be provided that at the axial circumferential surface, which faces away from the positive pressure region, an axial circumferential surface of the inwardly tensioning plain compression ring which faces the positive pressure region, in each case a ring shape lubrication groove is designed, whereby both of the lubrication grooves are in a flow connection with each other through the leakage area. Through the design of a second lubrication groove, also the weight of the inwardly tensioning plain compression ring is reduced.

Basically, an inwardly tensioning plain compression ring with a radial lubrication groove and one or two axial lubrication grooves is possible as well.

The inwardly tensioning plain compression ring, in accordance with the invention, can be installed in different sealing systems. Applications, in which the inwardly tensioning plain compression rings are exposed to large stress and require corresponding intensive lubrication, arise in the transmission technology of vehicles. For instance, an inwardly tensioning plain compression ring, in accordance with the invention, can serve for the sealing of a rotating shaft in reference to a fixed flange for a pressure oil supply of an hydraulically activated clutch. Hereby, the inwardly tensioning plain compression ring is located, with axial and radial play, in a groove of the flange, whereby the ring by means of the application of pressure is tensioned as well as fixed or slidingly attached with a side surface of the groove at the axial circumferential surface which is facing away from an positive pressure region, and is fixedly or slidingly attached through application of pressure and/or self-springing with a radial inner circumferential surface at an outer surface of the shaft.

In such a configuration, two or more of such inwardly tensioning plain compression rings can be installed, whereby an overpressure region is positioned axial between the inwardly tensioning plain compression rings and a low pressure area is axially outside of the inwardly tensioning plain compression rings.

BRIEF DESCRIPTION OF THE DRAWINGS

For a further clarification of the invention, drawings of two embodiments are attached to the description. These show:

FIG. 1 the first embodiment with two inwardly tensioning rings in accordance with the invention in an installed condition in a cross section;

FIG. 2 the partial side view of the inwardly tensioning plain compression ring of the FIG. 1 with a T-lock FIG. 3 an enlarged presentation of the inwardly tensioning plain compression ring of the FIG. 2 in a perspective view in the area of the T-lock FIG. 4 a second embodiment with two inward tensioning inwardly tensioning plain compression rings, in accordance with the invention, in the installed condition and in a section view FIG. 5 a partial sight view of the inwardly tensioning plain compression ring of FIG. 4 with a T-lock, and FIG. 6 an enlarged presentation of the inwardly tensioning plain compression ring of FIG. 5 in a perspective view in the area of the T-lock.

DETAILED DESCRIPTION OF THE PREFERRED EMBODIMENTS

Accordingly schematically shown in FIG. 1 are two inward tensioning inwardly tensioning plain compression rings 4 with a pressurized oil feed are installed for sealing off the rotating shaft 2 in reference to a fixed flange 1. The two plain compression rings 4 separate a positive pressure region or pressure chamber 3, respectively, located between the plain compression rings 4 from axially extending low pressure areas 16, axially outside of the two compression rings 4. The pressure chamber 3 is filled with a lubricant which is under pressure. From the pressure chamber 3, the lubricant passes through a radial circumferential gap 20 between the shaft 2 and the flange 1 to the plain compression rings 4. The two plain compression rings 4 are located each with axial and radial play in a groove 21, which is located in the flange 1, and are in reference to a radial outer surface 22 of the shaft 2 preloaded due to their self-springing. During the application of pressure by the lubricant, the two plain compression rings 4 are each, at the side which is facing away from the pressure chamber 3, axially attached at a sidewall 23 of the groove 21. The plain compression rings 4 are therefore effective as sealing rings, axially outward and radially inward.

At their radial, inner circumferential surface 11 (FIG. 3), the plain compression rings 4 each has a ring shape duplication groove 7, through which a lubricant can flow. The contact surface between the radial, inner circumferential surface 11 and the outer surface 22 of the shaft 2 create therefore a sliding surface while the plain compression ring 4 is fixed axially at the flange 1.

The construction of the plain compression rings 4 is shown in more detail in

FIGS. 2 and 3. Hereby, the plain compression ring 4 is designed as radially slotted and has therefore, has two circumferentially relative opposite ends 9, 10, which are configured as a T-lock 5. The first end of the ring 9 has a T-shape cross-section, whereby the shorter axial leg 17 is positioned radially outside and the longer leg 18 points towards the inside. The two legs 17, 18 form in the direction of the circumference, a continuation of the first ring end 9. The opposite, second ring end 10 has, matching with the continuation, a two-leg receptacle 19, wherein the long leg 18 of the T-lock 5 engages between the two legs of the receptacle 19 and the short leg 17 of the T-lock 5 overlaps the receptacle 19 radially at the outside. The long leg 18 acts therefore as a guide for the T-lock 5.

The lubrication groove 7 which is designed at the radial, inner circumferential surface 11 of the plain compression ring 4 has, with reference to the circumference, an open end 11 and a closed end 13, wherein the closed end 13 is adjacent to the first end 9 of the ring and the open end 14 of T-shaped forms the receiving second end 10 of the ring.

In the closed or partially closed position of the plain compression ring 4, a leakage area 15 is formed on the outer circumference or on its outer circumferential surface 24 in the region of the T-lock 5 on the part of the receptacle shaped second end 10 of the ring, which is supplied with lubricant via the pressure chamber 3. The leakage area 15 is in flow connection with an overflow area 6. The overflow area 6 is designed as a gap shaped chamber which extends mainly at the inner circumferential surface 11 of the plain compression ring 4 between the open end 14 of the lubrication groove 7 and the free end of the longer leg 18 of the T-lock 5. The overflow area 6 is limited by the two ring ends 9, 10 as well as by the outer surface 22 of the shaft 2, which adjoins the radial, inner circumferential surface 11, and continues into the open end 14 of the lubrication groove 7. The lubrication groove 7 is therefore during operation, through the pressure chamber 3 and the T-lock 5, permanently supplied with lubricant and forms a lubrication film at the radial, inner circumferential surface 11 of the plain compression ring 4.

FIG. 4 shows an almost identical construction of the pressure oil supply in FIG. 1, but with axial sliding surfaces. Hereby, two plain compression rings 4' are installed and their construction is presented in detail in FIGS. 5 and 6.

Accordingly, the plain compression ring 4' has at an axial circumferential surface 12 a ring shape lubrication groove 8. This axial circumferential surface 12 creates with the sidewall 23 of the groove 21 of the fixed part 1, in which the ring 4' is present, an axial sliding surface. The T-lock 5 matches the embodiment of FIGS. 2 and 3. The lubrication groove 8 has again a closed end 13' with reference to the T-shaped first ring end 9, and an open end 14' in reference of the second ring end 10 designed as the receptacle 19. The open groove end 14' leads into an overflow area 5' which is flow connected with a leakage area 15' at the outer circumference (outer circumferential surface 24) of the plain compression ring 4'

At the opposite axial circumferential surface 12' of the plain compression ring 4' is a respective second lubrication groove 8' which is flow connected with the first lubrication groove 8 through the leakage area 15' (see FIG. 4). Both lubrication grooves 8, 8' can perform the same function, so that the installation of the plain compression ring 4' can take place independent from the direction.

REFERENCE CHARACTERS

1 Fixed Part, Range
2 Rotating Part
3 Positive pressure region, Pressure Chamber
4, 4' Inwardly tensioning plain compression ring
5 Joint, Lock
6, 6' Overflow Area
7 Radial Lubrication Groove
8, 8' Axial Lubrication Groove
9 First Ring End
10 Second Ring End
11 Radial Inner Circumferential surface
12, 12' Axial Circumferential surface
13, 13' Closed Groove End
14, 14' Open Groove End
15, 15' Leakage Area
16 Low Pressure Area
17 Short Leg of the T-Lock 5
18 Long Leg of the T-Lock 5
19 Receptacle
20 Gap
21 Groove in the fixed Part 1
22 Outer Surface
23, 23' Side Wall of the Groove 21 of the Fixed Part 1
24 Outer Circumferential surface of the Inwardly tensioning plain compression ring

The invention claimed is:

1. An inwardly tensioning plain compression ring for sealing of a rotating part with respect to a fixed part, and the compression ring separating a positive pressure region from a low pressure area, the compression ring comprising:
   circumferential opposite first and second ring ends being designed as either a joint or a lock, the compression ring extending completely about an annular surface of one of the fixed and the rotating parts such that the first and the second ring ends are connectable with one another,
   a radial, inner circumferential surface of the compression ring mating with the annular surface of the one of the fixed and the rotating parts about an entire circumference of the annular surface and having only a single ring shaped lubrication groove accommodating a lubricant supplied from the positive pressure region,
   the lubrication groove having a closed end located adjacent the first ring end of the compression ring and an open end located at the second ring end of the compression ring, and the lubrication groove having a cross section that is continuous from the closed end to the open end,
   the open end of the lubrication groove continuing into an overflow area which is in flow connection with a leakage area of the joint or the lock.

2. The inwardly tensioning plain compression ring according to claim 1, wherein the first and the second ring ends are designed as a T-lock, the first ring end has a T-shaped cross-section and has a radially outer short leg and a radially inner long leg, the long leg is connected to the short leg centrally between opposite ends of the short leg, the short and the long legs form, in a circumferential direction, a continuation of the first ring end, the second ring end is designed as a receptacle which receives the continuation of the first ring end, the long leg enters into the receptacle and the short leg overlaps the receptacle radially outside, and the open end of the lubrication groove is positioned at the second ring end such that, at a radial outer circumferential surface of the compression ring, in an open end section of the T-lock, the leakage area is designed which receives the lubricant from the positive pressure region and supplies the overflow area of the lubrication groove with the lubricant, the compression ring having two axially opposite side faces, and the lubrication groove being formed in the inner circumferential surface centrally between the two axially opposite side faces of the compression ring.

3. The inwardly tensioning plain compression ring according to claim 1, wherein the first and the second ring ends have, in a circumferential direction, either rounded or chamfered edges, and the closed end of the lubrication groove completely blocks a flow of the lubricant along the lubrication groove in one flow direction.

4. The inwardly tensioning plain compression ring according to claim 1, wherein the first and the second ring ends have, in a circumferential direction, chamfered edges, and a flow of the lubricant along the lubrication groove from the open end is stopped by the closed end of the lubrication groove.

5. The inwardly tensioning plain compression ring according to claim 1, wherein the lubrication groove is formed in the radial, inner circumferential surface of the compression ring, the overflow area is a gap shaped chamber which extends at the inner circumferential surface of the compression ring between the open end of the lubrication groove and a free end of a longer leg of a T-lock, and which is limited by the first and the second ring ends, and an adjacent surface, axial to the circumferential surface, of the one of the fixed and the rotating parts which are sealed against each other.

6. The inwardly tensioning plain compression ring according to claim 1, wherein the plain compression ring is positioned for sealing a rotating shaft to a fixed flange and is positioned in an annular groove, incorporated in the flange, with axial and radial play such that the plain compression ring, through application of pressure, attaches either fixed or sliding at a side surface of the annular groove, at the axial circumferential surface of the one of the fixed and the rotating parts facing away from the positive pressure region and, during at least one of application of pressure and self-springing, attaches either fixed or sliding to the radial, inner circumferential surface at an outer surface of the shaft.

7. An inwardly tensioning plain compression ring received within a radially inner annular groove of a fixed part and forming a seal between a rotating part and the fixed part to axially separate a positive pressure region from a low pressure region, the compression ring comprising:
opposed first and second axially facing surfaces and radially opposed inner and outer surfaces;
first and second circumferential ends, the first circumferential end having an extension formed by a short leg and a long leg, the short leg extending along a circumference of the compression ring and being flush with the radially outer surface, and the long leg being fixed to the short leg at a position centrally between axially opposite ends of the short leg and extending radially inward from the short leg such that the extension has a T-shaped cross section, the second circumferential end having first and second legs that extend therefrom and are respectively axially separated from each other by a gap and form a receptacle;
the extension being received within the receptacle so as to couple the first and the second circumferential ends of the compression ring such that opposite axially facing surfaces of the long leg abut a respective one of the first and the second legs of the second circumferential end;
the radially inner surface of the compression ring comprises only a single lubrication groove having a closed end that is adjacent the first circumferential end of the compression ring and blocks a flow of lubricant in a first direction along the lubrication groove, and an open end which is open to the gap in the receptacle, the lubrication groove continuously spans from the closed end to the open end along the radially inner surface centrally between the first and the second axially facing surfaces; and
the gap in the receptacle and the open end of the lubrication groove facilitating the flow of lubricant in the first direction along the lubrication groove from the positive pressure region to the closed end of the lubrication groove so as to lubricate contact between the radially inner surface of the compression ring and an outer surface of the rotating part.

8. The inwardly tensioning plain compression ring according to claim 7, wherein the gap in the receptacle being aligned with the lubrication groove, and the lubrication groove having an axial width that is equal to an axial width of the gap in the receptacle.

* * * * *